(12) United States Patent
Arimanda et al.

(10) Patent No.: US 11,088,952 B2
(45) Date of Patent: Aug. 10, 2021

(54) NETWORK TRAFFIC CONTROL BASED ON APPLICATION PATH

(71) Applicant: Juniper Networks Inc., Sunnyvale, CA (US)

(72) Inventors: Sravanthi Arimanda, Bangalore (IN); Rajeev Chaubey, Bangalore (IN); Rakesh Kumar Sharma, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 55 days.

(21) Appl. No.: 16/439,236

(22) Filed: Jun. 12, 2019

(65) Prior Publication Data

US 2020/0396164 A1    Dec. 17, 2020

(51) Int. Cl.
*G06F 15/173*    (2006.01)
*H04L 12/801*    (2013.01)

(52) U.S. Cl.
CPC .................... *H04L 47/12* (2013.01)

(58) Field of Classification Search
CPC .... H04L 47/12; H04L 12/1886; H04W 40/12; H04W 48/06; H04W 48/02; H04W 48/00
USPC .................................................. 709/225, 226
See application file for complete search history.

(56) References Cited

U.S. PATENT DOCUMENTS

| | | | | |
|---|---|---|---|---|
| 7,313,614 | B2 * | 12/2007 | Considine | G06F 11/2074 709/217 |
| 7,401,057 | B2 * | 7/2008 | Eder | G06N 5/022 706/20 |
| 7,735,116 | B1 | 6/2010 | Gauvin | |
| 7,882,247 | B2 * | 2/2011 | Sturniolo | H04W 12/03 709/228 |
| 7,930,740 | B2 * | 4/2011 | Davis | H04L 63/0227 726/22 |
| 8,892,665 | B1 * | 11/2014 | Rostami-Hesarsorkh | H04L 43/08 709/206 |
| 9,398,043 | B1 * | 7/2016 | Yang | H04L 63/1441 |
| 9,419,942 | B1 * | 8/2016 | Buruganahalli | H04L 63/0236 |
| 9,912,695 | B1 * | 3/2018 | Chao | H04L 63/1425 |

(Continued)

FOREIGN PATENT DOCUMENTS

EP    3229407 A1    10/2017

OTHER PUBLICATIONS

Extended European Search Report for Application No. EP19200394.5, dated Mar. 26, 2020, 8 pages.

*Primary Examiner* — Thu Ha T Nguyen
(74) *Attorney, Agent, or Firm* — Harrity & Harrity, LLP (57) ABSTRACT

A network device may receive network traffic associated with a session, wherein the session is associated with a network. The network device may determine, from the network traffic, an application path that is associated with the session, wherein the application path is associated with a communication protocol and an application protocol. The network device may determine, based on policy information that is associated with the application path, whether the network traffic associated with the session is capable of being communicated via the network using the communication protocol and the application protocol. The network device may perform, based on whether the network traffic is determined to be capable of being communicated, an action associated with enabling or preventing communication of the network traffic.

20 Claims, 7 Drawing Sheets

(56) References Cited

U.S. PATENT DOCUMENTS

| | | | |
|---|---|---|---|
| 9,967,292 B1* | 5/2018 | Higgins | H04L 63/0218 |
| 10,193,698 B1* | 1/2019 | Das | H04L 9/3268 |
| 10,291,651 B1* | 5/2019 | Chaubey | H04L 63/20 |
| 2006/0095969 A1* | 5/2006 | Portolani | H04L 67/1002 |
| | | | 726/23 |
| 2006/0182103 A1* | 8/2006 | Martini | H04L 63/145 |
| | | | 370/389 |
| 2007/0168499 A1* | 7/2007 | Chu | G06F 21/629 |
| | | | 709/224 |
| 2008/0115203 A1* | 5/2008 | Elzur | H04L 9/083 |
| | | | 726/12 |
| 2009/0240874 A1* | 9/2009 | Pong | G06F 12/0223 |
| | | | 711/105 |
| 2011/0107413 A1* | 5/2011 | Chawla | H04L 63/0227 |
| | | | 726/12 |
| 2012/0253780 A1* | 10/2012 | Talla | H04L 47/122 |
| | | | 703/23 |
| 2014/0044018 A1* | 2/2014 | Billau | H04L 12/1485 |
| | | | 370/259 |
| 2014/0075567 A1* | 3/2014 | Raleigh | G06Q 30/0601 |
| | | | 726/26 |
| 2014/0355520 A1* | 12/2014 | Wallis | H04L 65/1016 |
| | | | 370/328 |
| 2016/0006755 A1* | 1/2016 | Donnelly | H04L 63/1441 |
| | | | 726/1 |
| 2016/0080195 A1* | 3/2016 | Ramachandran | H04L 45/38 |
| | | | 370/220 |
| 2016/0219024 A1* | 7/2016 | Verzun | H04L 63/102 |
| 2017/0026186 A1* | 1/2017 | Gu | H04L 9/3268 |
| 2017/0063557 A1* | 3/2017 | Chalmandrier-Perna | |
| | | | H04L 63/1425 |
| 2017/0257388 A1* | 9/2017 | Addepalli | H04L 63/1458 |
| 2017/0288987 A1* | 10/2017 | Pasupathy | H04L 67/02 |
| 2017/0366467 A1* | 12/2017 | Martin | H04L 47/2433 |
| 2019/0036981 A1* | 1/2019 | Thippesh | H04L 29/06 |
| 2019/0058729 A1* | 2/2019 | Brecl | H04L 63/1458 |
| 2019/0075511 A1* | 3/2019 | Ryu | H04W 88/14 |
| 2019/0124043 A1* | 4/2019 | Xu | H04L 63/029 |
| 2019/0230032 A1* | 7/2019 | Landau | H04L 65/102 |
| 2019/0357301 A1* | 11/2019 | Li | H04W 40/20 |
| 2020/0037165 A1* | 1/2020 | Kunz | H04W 8/24 |
| 2020/0259786 A1* | 8/2020 | Saarinen | H04L 63/0414 |
| 2020/0267785 A1* | 8/2020 | Talebi Fard | H04W 40/248 |
| 2020/0396164 A1* | 12/2020 | Arimanda | H04L 63/0236 |
| 2021/0076299 A1* | 3/2021 | Chunduri | H04W 36/02 |

* cited by examiner

FIG. 1

| Application Protocol 1 | |
|---|---|
| Application Path | Action |
| *.SSL | Allow |
| *.SOCKS.+ | Allow |
| *.QUIC.*.HTTP | Deny |
| ... | ... |

Application Path Truncation

NETWORK TRAFFIC CONTROL BASED ON APPLICATION PATH

BACKGROUND

A network device, such as a firewall or other security device, of a network may be used to allow or block network traffic associated with the network. For example, the network device may use a set of policies to block or allow network traffic sent to the network, network traffic sent from the network, and/or network traffic sent within the network.

SUMMARY

According to some implementations, a method may include receiving network traffic, wherein the network traffic is associated with a session associated with a network, wherein the session is associated with an application protocol; determining an application path associated with the network traffic, wherein the application path identifies a communication protocol for the session and the application protocol; performing a lookup operation associated with the application path to identify a policy information associated with the application path; determining, based on the lookup operation, whether the network traffic can be communicated via the network using the communication protocol and the application protocol; and enabling when the network traffic is determined to be able to be communicated via the network, communication of the network traffic via the network, or preventing when the network traffic is determined to not be able to be communicated via the network, communication of the network traffic via the network.

According to some implementations, a network device may include one or more memories; and one or more processors, communicatively coupled to the one or more memories, configured to: receive network traffic associated with an application protocol, wherein the network traffic is associated with a session involving a network; identify an application path from the network traffic, wherein the application path identifies a communication protocol for the session and the application protocol; obtain, from a policy mapping, policy information associated with the application path, wherein the policy mapping includes policies for communication protocols that can be used for sessions associated with a plurality of application protocols; determine, based on the policy information, whether communication of network traffic associated with the session is allowable via the network; and perform, based on whether communication of the network traffic is allowable via the network, an action associated with the network traffic.

According to some implementations, a non-transitory computer-readable medium may store one or more instructions. The one or more instructions, when executed by one or more processors of a network device, may cause the one or more processors to: receive network traffic associated with a session, wherein the session is associated with a network; determine, from the network traffic, an application path that is associated with the session, wherein the application path is associated with a communication protocol and an application protocol; determine, based on policy information that is associated with the application path, whether the network traffic associated with the session is capable of being communicated via the network using the communication protocol and the application protocol; and perform, based on whether the network traffic is determined to be capable of being communicated, an action associated with communication of the network traffic.

DETAILED DESCRIPTION

The following detailed description of example implementations refers to the accompanying drawings. The same reference numbers in different drawings may identify the same or similar elements.

A firewall may be used to allow deny, rate limit, or enforce other actions on network traffic based on a policy implemented by the firewall and one or more characteristics of the network traffic. Such a policy may be a communication protocol-based policy that allows or denies a communication based on the communication protocol of the communication. Accordingly, a firewall that uses such a communication protocol-based policy may allow or deny network traffic (e.g., communication of the network traffic) within a network depending on the communication protocol used to communicate the network traffic. However, if a particular policy is to deny network traffic via a particular communication protocol, such a communication protocol-based policy causes the firewall to prevent any or all network traffic that is to be communicated via that communication protocol. Moreover, in some instances, certain network traffic must be transmitted and/or received by an endpoint device of a network via a communication protocol that is to be blocked or denied by a communication protocol-based policy. Accordingly, such network traffic may be unable to bypass the firewall if the firewall is configured to utilize such a communication protocol-based policy, regardless of the content of the network traffic, regardless of whether a source or a destination needs to receive the network traffic for a particular purpose, regardless of whether the network traffic contains malware, etc.

In some instances, certain application protocols (and/or certain applications) are configured for use with certain communication protocols. Accordingly, if a communication-protocol based network policy blocks communication protocols that are to be used with a particular application protocol, any endpoint devices in the network may not be able to access and/or utilize applications that utilize such application protocols. The network traffic associated with an application protocol may not be able to reach an endpoint of a network unless the firewall uses a policy that allows network traffic associated with that application protocol. Such a policy may conflict with a communication-based policy if network traffic associated with the application protocol is to be communicated via a communication protocol that is to be blocked by the communication-based policy. A firewall may be configured (e.g., by a user, such as a network administrator) to enforce policies that allow an application protocol to communicate using a particular communication protocol. However, if the communication protocol is to be denied for one or more other application protocols, corresponding policies need to be individually created and applied to deny that network traffic for the one or more other application protocols. As an example, if the firewall is to allow network traffic to be communicated via a communication protocol for only a single application protocol, hundreds or thousands of policies may need to be written to deny network traffic associated with any other application protocols that may be communicated via that communication protocol (because a single communication-protocol based policy cannot be written since it would deny network traffic associated with that single application). Accordingly, several computing resources (e.g., processing resources, memory resources, storage resources, and/or the like) may be consumed to create, store, and enforce these policies.

Some implementations described herein permit a network device to be configured with one or more policies for network traffic based on an application protocol and an application path of the network traffic. As described herein, such a policy can be enforced by the firewall to only allow network traffic associated with a particular application protocol when the network traffic is to be communicated by a particular communication protocol indicated in the application path. Accordingly, the firewall may utilize an application protocol based policy (rather than a communication protocol based policy) that permits network traffic for an application protocol via a particular communication protocol but denies network traffic associated with the application protocol via another communication protocol.

As described herein, an application path may identify a communication protocol for network traffic of a session of an application. According to some implementations, the firewall may identify (e.g., in a packet of a data communication) the application path and a corresponding communication protocol for network traffic for the session. In such a case, if the network traffic is to be allowed according to the application-based policy (e.g., if the application protocol-based policy for that application allows network traffic for the specified communication protocol in the application path), the firewall may permit the network traffic for the session to be communicated. Alternatively, if the network traffic is to be denied according to the application protocol-based policy (e.g., if the application-based policy for that application indicates that network traffic communicated via the specified protocol is to be denied), the firewall may drop and/or prevent communication of the network traffic for the session. In some implementations, the network device may be configured to enforce a policy defined for an application protocol using a truncation identifier (e.g., a symbol, a character, a string, and/or the like) that indicates that any corresponding communication protocol(s) or application protocol(s) that may be identified within a portion of an application path can be considered when enforcing the policy. For example, if a '*' and '+' were to be used as truncation identifiers, that '*' in the application path "*.TLS.+" may indicate that any corresponding communication protocol may be included in a layer below TLS in the protocol stack, and the '+' may indicate that at least one communication protocol or application protocol element is to be included in a layer above TLS in the protocol stack.

In this way, a network device may use an application protocol-based policy that is more granular relative to a communication protocol-based policy and prevents unwanted dropping of network traffic due to a communication protocol associated with the network traffic, without requiring individual policies to be created, stored, and/or enforced for all application protocols that may be associated with network traffic communicated via the network. In this way, a network device conserves resources (e.g., computing resources and/or network resources) that would otherwise be wasted transmitting and/or processing network traffic that would be dropped based on a communication protocol-based policy. Although some examples described herein refer to generating and/or using a policy based on an application protocol, such a policy may similarly be generated and/or used based on a particular application and/or a particular session.

Figure 1:
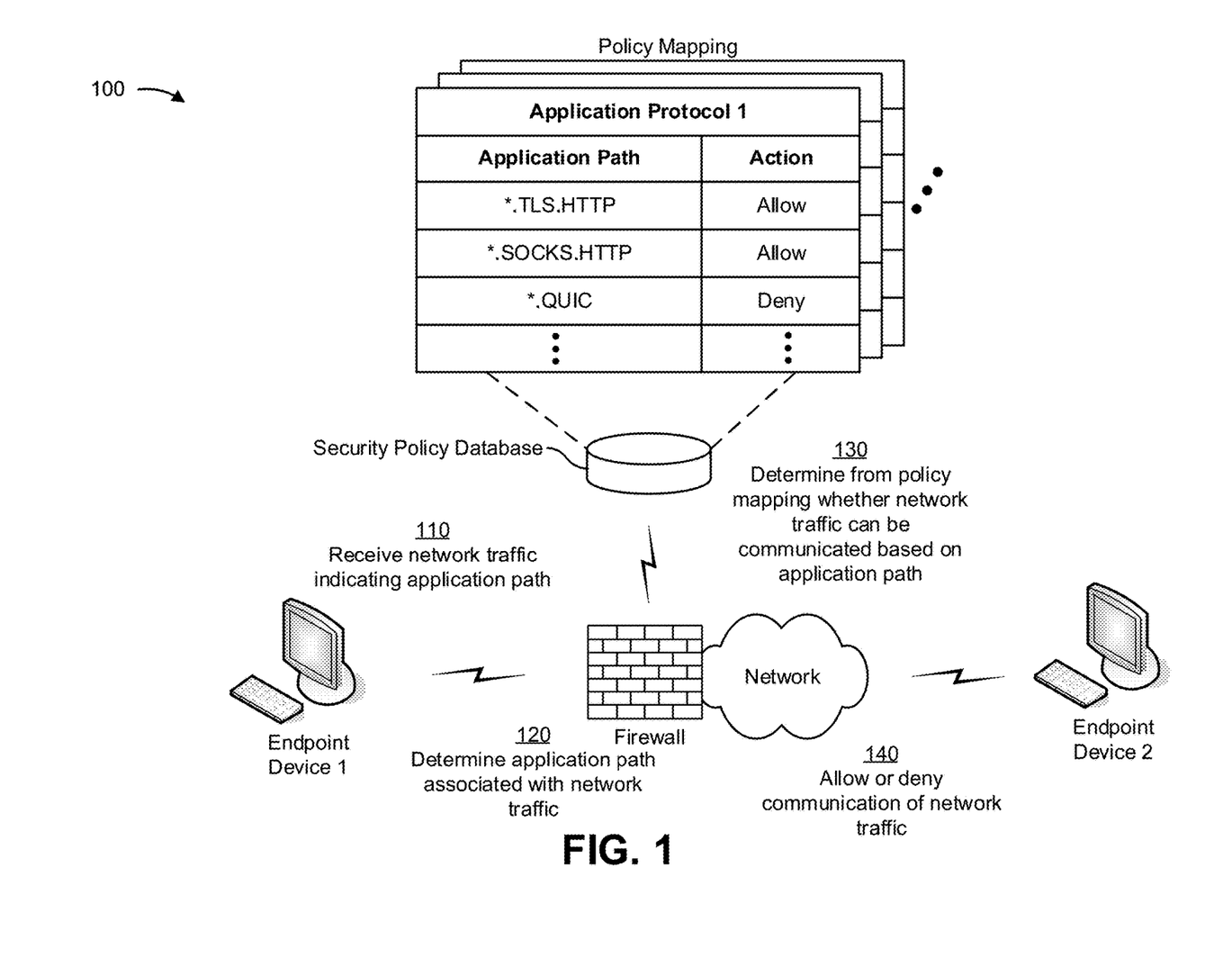
FIGS. 1 and 2 are diagrams of one or more example implementations described herein.

FIG. 1 is a diagram of an example implementation 100 described herein. Example implementation 100 includes a first endpoint device (shown as "Endpoint Device 1"), a second endpoint device (shown as "Endpoint Device 2"), a network, a firewall, and a security policy database (e.g., a data structure that stores a policy mapping and/or policy information for the firewall). As shown, the security policy database includes policy information and is communicatively coupled with the firewall. In some implementations, the security policy database may be included within a network device of the firewall and/or associated with a same network device as the firewall.

In example implementation 100, the firewall may be a network device (and/or may be associated with or included within a network device) that manages communication (or flow) of network traffic to the network, from the network, and/or within the network. Additionally, or alternatively, the firewall may be located within and/or may be a firewall of the first endpoint device or the second endpoint device. In FIG. 1, the first endpoint device and the second endpoint device may be communicatively coupled via the network. Accordingly, in order for the first endpoint device to transmit a data communication to the second endpoint device, the firewall needs to be configured to allow the data communication to pass through the network to the send endpoint device.

As described herein, the first endpoint device and/or the second endpoint device may host and/or run an application (e.g., a computer program, a mobile application, an online application, a cloud-based application, and/or the like) that is involved in a session. Accordingly, the first endpoint device and/or the second endpoint device, in association with the session, may transmit a data communication and/or network traffic associated with the session. As described in connection with example implementation 100, the firewall may be configured (e.g., using one or more policies) to allow or deny the communication of such network traffic via the network.

As shown in FIG. 1, and by reference number 110, the firewall receives network traffic indicating an application path. For example, the network traffic may be associated with a session (e.g., an application session, a communication session, and/or the like) that involves communicating network traffic via the network. The network traffic may include one or more data communications of messages, protocol data units (PDUs) (e.g., packets or other units of data).

The session may be associated with an application that utilizes and/or is associated with an application protocol. As described herein, a session may be associated with a particular protocol stack that identifies particular protocols (e.g., communication protocols, security protocols, application protocols, and/or the like) that are to be utilized during the session. In some implementations, the application path may be representative of the protocol stack of a session. For example, the application path may include one or more elements (e.g., in a string, in a graph, or other type of representation) corresponding to layers of the protocol stack.

The protocol stack may correspond to an open systems interconnection (OSI) model. In such cases, a first layer (L1) of the protocol stack may be a physical layer for the session, the second layer (L2) of the protocol stack may be a data link layer for the session, a third layer (L3) may be a network layer for the session, a fourth layer (L4) may be a transport layer for the session, a fifth layer (L5) may be a session layer for the session, a sixth layer (L6) may be a presentation layer for the session, and a seventh layer (L7) may be an application layer for the session. One or more layers of the protocol stack may be referred to herein as a communication protocol or an application protocol. For example, depending on available information associated with a session and/or a particular application path, a communication protocol may correspond to one or more of L5 or L6 while an application protocol may correspond to L7. In some implementations, the communication protocol may correspond to an L7 protocol and an application protocol may correspond to a layer that is above L7 (e.g., application specific protocols). In some implementations, described herein, the protocol stack may be generalized to include one or more application protocols over (in a next layer above) one or more application protocols.

Accordingly, during a session, network traffic may include data that is configured and/or formatted for a particular protocol of the protocol stack, in turn, formatted as per an adjacent layer in the stack. For example, data for an application protocol may be formatted for the adjacent communication protocol layer. More specifically, application data of a session may be formatted over hypertext transfer protocol (HTTP) (an application protocol) data, and the HTTP data may be formatted over a transmission control protocol (TCP) (a communication protocol) data, and so on. Other examples of application protocols may include a file transfer protocol (FTP), trivial file transfer protocol (TFTP), a simple mail transfer protocol (SMTP), a real-time transport protocol (RTP), and/or the like. As mentioned above, in some implementations, for a particular session, an application protocol may be determined to be in a layer of the protocol stack that corresponds to a communication protocol for another session.

In some implementations, the network traffic includes a plurality of communications (e.g., a plurality of messages, PDU transmissions, and/or the like) that are to facilitate a session involving the first endpoint device and the second endpoint device. For example, the first endpoint device may send network traffic via the network for the session, and/or the second endpoint device may correspondingly reply with network traffic for the session (or vice versa). Accordingly, the firewall may receive and/or intercept the network traffic to determine whether the network traffic and/or a session associated with the network traffic can be communicated via the network (e.g., according to a policy defined in the policy mapping).

In this way, the firewall may receive (and/or intercept) network traffic that is communicated and/or is to be communicated via the network to permit the firewall to determine whether to allow or deny communication of the network traffic.

As further shown in FIG. 1, and by reference number 120, the firewall identifies an application path associated with the network traffic. For example, the firewall may preprocess and/or parse the application path from the network traffic. More specifically, the firewall, using a deep packet inspection (DPI), may identify a PDU of the network traffic that is associated with the application path (e.g., associated with one or more layers of the protocol stack of the session). The firewall may extract and/or parse the application path from the PDU to determine and/or identify one or more communication protocols associated with an application that transmitted or is intended to receive the network traffic. In some implementations, the application protocol is included within and/or identified in a PDU of the network traffic and/or can be identified or determined to be a part of the application path. Accordingly, the firewall may determine, from the data communication, the application path from the network traffic.

In some implementations, the firewall (e.g., using DPI) may analyze the application path to determine and/or identify the communication protocol associated with the network traffic. Some examples of the communication protocol may include one or more of a transmission control protocol (TCP), a transport layer security (TLS) protocol, a secure socket layer (SSL) protocol, a quick user datagram protocol (UDP) Internet connection protocol (QUIC) protocol, or SOCKS protocol (e.g., SOCKS4, SOCKS5, and/or the like). As an example, to identify a communication protocol and/or application protocol from the application path, the firewall may parse one or more communication protocol elements and/or one or more application protocol elements from the application path. For example, the firewall may determine from the application path *.TLS.HTTP (e.g., ETH.IP.TLS.HTTP) that a session associated with the network traffic is associated with an application protocol 1 (e.g., NETFLIX™, FACEBOOK™, AND/OR THE LIKE) and that HTTP over TLS as the communication protocol for the session. As another example, from the application path *.SOCKS.HTTP, the firewall may identify application protocol 1 is associated with the network traffic and SOCKS.HTTP as the communication protocol for the session. In this way, by analyzing the application path, the firewall may identify the communication protocol and/or the application protocol associated with the network traffic and/or the session.

In this way, the firewall may identify the application path and/or the application protocol associated with the network traffic to permit the firewall to determine a policy, from the policy mapping, associated with allowing or denying communication of the network traffic via the network.

As further shown in FIG. 1, and by reference number 130, the firewall may determine, from the policy mapping, whether network traffic can be communicated based on the application path. As described herein, the network traffic may be associated with a session of an application that is to involve the first endpoint device and the second endpoint device communicating via the network. Accordingly, using policy information (e.g., information and/or data that identifies policies for allowing network traffic and/or policies for denying network traffic) in the policy mapping, the firewall may determine whether network traffic associated with the session can be communicated via the network.

Upon receipt of the network traffic and/or determination of an application protocol associated with the network traffic (e.g., the application protocol used in the session), the firewall may perform a lookup operation that involves scanning the security policy database for policy information associated with the application protocol. As shown in FIG. 1, the policy information may be represented (e.g., for each possible application protocol) in a mapping (or table) of the security policy database. Additionally, or alternatively, the policy information may be included in a list (e.g., a structured list sorted by application protocol, an unstructured list, and/or the like), an index (e.g., that indexes the policy information based on the application protocol), a graph, and/or the like.

According to some implementations, when performing the lookup operation, the firewall may identify the application path from the network traffic and locate (e.g., via DPI), in the policy mapping, an entry associated with the application path and/or the communication protocol of the application path (e.g., as determined from a portion of the application path). In some implementations, the application protocol may be appended (e.g., towards an end of the application path associated with an upper layer of the protocol stack) or included within an application path (e.g., in the middle of the application path corresponding to a middle layer of the protocol stack). For example, the application protocol may correspond to a top layer of the protocol stack that has been identified by the firewall when determining the application path. Accordingly, based on determining the application path, the firewall may corresponding determine the application protocol and the remaining elements of the application path (e.g., corresponding to the lower layers of the protocol stack) may be determined to be the one or more communication protocols for the session. For example, assuming the application protocol of the network traffic is Application Protocol 1, the firewall may determine that an identifier for application protocol 1 is appended to an end of the application path and/or corresponds to a top layer of the protocol stack for the session. Accordingly, as shown in FIG. 1, and the firewall may locate the table for Application Protocol 1 (e.g., by parsing the application protocol from the application path and/or the communication protocol from the application protocol) and may then locate an entry (e.g., based on the determined application path) of the table for Application Protocol 1 that corresponds to the application path (and/or the communication protocol of the application path).

In some implementations, the firewall may identify the communication protocol based on identifying an entry that includes the application path (e.g., by performing the lookup operation and/or scanning the security policy database for the application path or a portion of the application path). The firewall may then obtain policy information from the entry for the communication protocol and application protocol. As shown, the policy information may indicate whether the communication protocol associated with the application protocol is to be allowed or denied (corresponding to whether the network traffic can be communicated via the network).

Figure 2:
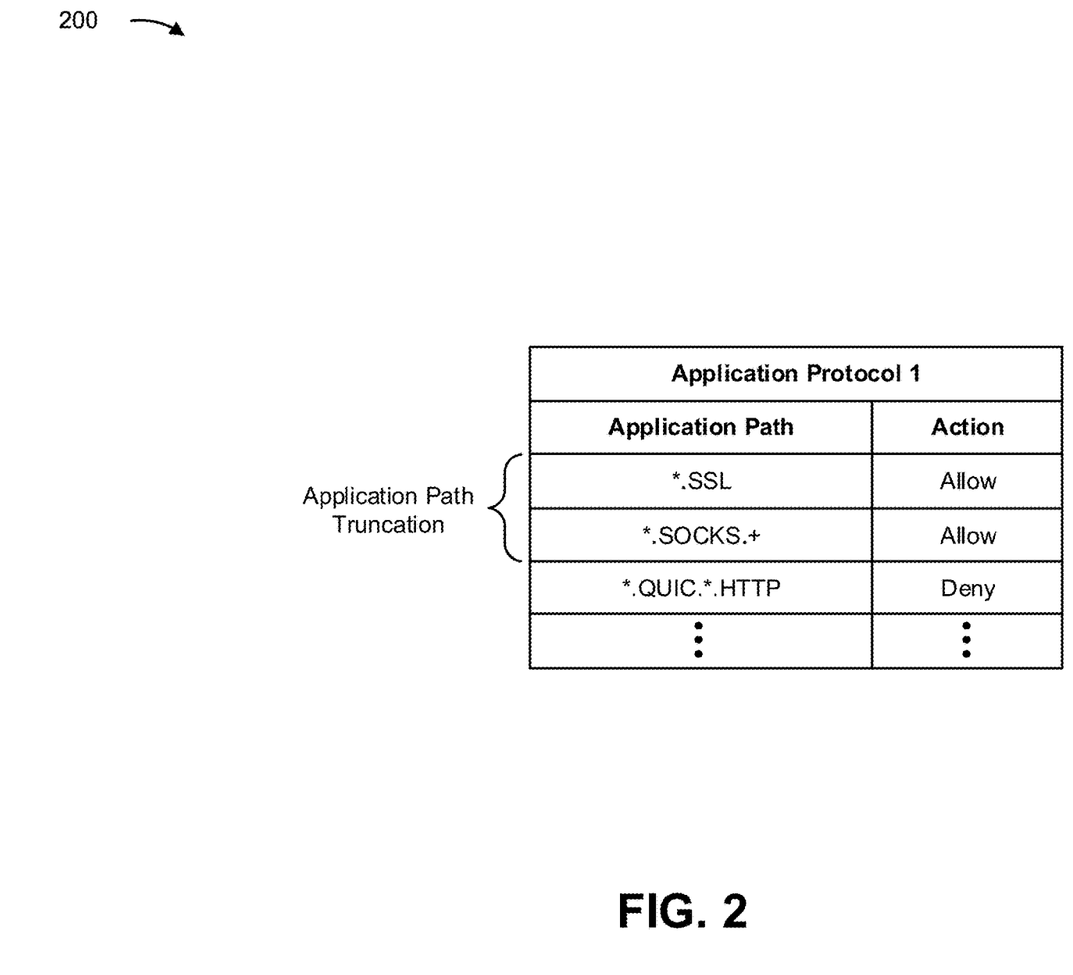

As described herein in connection with FIG. 2, one or more entries in the policy mapping may be associated with a communication protocol by including a portion of the application path that is representative of a plurality of communication protocols. For example, an application path in the entry may include a truncation identifier that is representative (e.g., as an all-inclusive identifier) of the plurality of communication protocols. In this way, a single entry may be included in the policy mapping that is representative of a same policy for a plurality of communication protocols that can be used in association with an application protocol. Additionally, or alternatively, a similar truncation identifier may be used to represent a plurality of different application protocols. In some implementations, a matching identifier may be used to indicate that a specific application protocol must match at least one of a certain set of application protocols. In this way, a single entry may be used to define a same policy for a plurality of different communication protocols, a plurality of different application protocols, and/or a plurality of different applications.

In this way, the firewall may perform a lookup operation associated with the communication protocol and the application protocol to identify a policy associated with allowing or denying network traffic associated with the application protocol.

According to some implementations, the firewall (and/or another network device associated with the firewall) may be configured to generate and/or update policy information in the policy mapping. For example, the firewall may receive information associated with one or more security thresholds (or security requirements) associated with the network. Such security thresholds may include and/or be associated with levels or types of encryption, whether content of network traffic in the network is to be identifiable (and if so, the quantity of the content that is identifiable and/or capable of being analyzed), privacy settings for the network, and/or the like. Furthermore, the firewall may be configured to identify corresponding characteristics of network traffic, and/or application protocols to configure policies for the application protocols. For example, based on the characteristics of the application protocols, the firewall may determine communication protocols that can be used in association with the application protocols and/or communication protocols that are not allowed to be used to communicate network traffic associated with the application protocols.

In some implementations, the firewall may be configured to generate the policy mapping according to one or more user inputs (e.g., one or more user inputs that identify and/or specify security thresholds and/or security characteristics that are to be considered in connection with defining a policy for a particular application protocol). One or more other factors may be considered with respect to defining policies for application protocols, such as load balancing (e.g., across different communication protocols), a capacity of the network, a quantity of devices communicating via the network, a topology of the network, and/or the like.

In this way, the firewall may determine, based on policy information that is associated with the application path and the application protocol, whether network traffic associated with the session is capable of being communicated via the network using the communication protocol to permit the firewall to perform an action associated with the network traffic.

As further shown in FIG. 1, and by reference number 140, the firewall allows or denies the network traffic. For example, the firewall may perform one or more actions associated with allowing the network traffic to be communicated (e.g., enabling the data communication and/or network traffic to be communicated, forwarding the data communication and/or network traffic, blocking or dropping the data communication and/or network traffic, and/or the like).

Additionally, or alternatively, the firewall may perform one or more other actions associated with communication of the network traffic. For example, the firewall may set parameters for communication of network traffic via the session. Such parameters may include a data rate, a usable bandwidth for communication of the network traffic, timing parameters (e.g., time limits, scheduling, and/or the like) associated the session, and/or the like. In this way, the firewall, when enabling the communication of the network traffic for the session may cause the network traffic to be communicated with particular parameters. Accordingly, the firewall may cause the session to be established via the network. In some implementations, the firewall may notify a source of the network traffic that the session can be established and/or that network traffic associated with the session can be communicated via the network (e.g., via an acknowledgement message).

Additionally, or alternatively, if communication of the network traffic associated with a session is to be prevented and/or denied, the firewall may send a notification that reflects the same. In some implementations, such a notification may indicate the reasoning used to determine that the communication cannot be performed via the network. For example, the firewall may indicate that a communication protocol identified by the application path cannot be used with that application protocol. Additionally, or alternatively, the firewall may indicate which communication protocols can be used in association with the application protocol to communicate network traffic via the network (e.g., according to the policies included in the policy mapping).

In some implementations, the firewall may maintain a log of policies enforced in association with network traffic associated with the network. For example, the firewall may indicate, in the log, the application path identified from the network traffic and log whether or not communication of the network traffic was allowed or denied. In some implementations, the firewall may log which entry, in the policy mapping, was used to allow or deny the communication (e.g., to permit enforcement of that policy to be reviewed and/or verified for accuracy). In such cases, the entry may reflect an application path of the policy. As described herein, the application path may be a full application that is to match an application path of the network traffic and/or a truncated application that includes one or more truncation identifiers. Accordingly, the firewall may utilize a log to permit the policy enforcement and/or one or more actions performed by the firewall to be reviewed, analyzed, and/or verified for accuracy.

In this way, the firewall may perform, based on whether communication of the network traffic is allowable via the network, one or more actions associated with the network traffic.

As indicated above, FIG. 1 is provided merely as one or more examples. Other examples may differ from what is described with regard to FIG. 1.

FIG. 2 is a diagram of an example implementation 200 described herein. Example implementation 200 includes an example policy mapping for Application Protocol 1 with entries that include one or more truncation identifiers and/or matching identifiers. As described herein, such entries may reduce the quantity of entries in the policy mapping needed to define policies for Application Protocol 1.

As described herein, an application path in an entry may include a truncation identifier that indicates that a plurality of communication protocols and/or applications are represented in the entry (e.g. to indicate that network traffic associated with an application protocol is allowable or not allowable using the plurality of communication protocols represented in the entry). For example, in FIG. 2, the asterisk (*) may be a truncation identifier that indicates that any indicated application path that includes the portion of the application path in each entry (aside from the truncation identifier) may correspondingly be allowed or denied as indicated by the action for the truncated application path. Further, in FIG. 2, the plus symbol (+) may be a matching identifier that indicates that any indicated application path that includes the portion of the application path and another matching portion may correspondingly be allowed or denied as indicated by the action for the truncated application path.

Accordingly, as shown in FIG. 2, the entry in the mapping with the truncated path *.SSL defines a policy that Application Protocol 1 is capable of being communicated via any SSL communication protocol. In this way, as long as the indicated application path of the network traffic associated with Application Protocol 1 ends with SSL, the network traffic is capable of being communicated via the network. In this way, an entry with the truncated path ETH.IP.TCP.SSL may be redundant (because ETH.IP.TCP.SSL is included as an application path in the truncated application path *.SSL), and thus can be removed from the mapping to conserve storage and/or processing associated with enforcing the policy defined by that entry. Moreover, the entry in the mapping with the truncated path *.SOCKS.+ uses application path truncation identifier (*) and truncation identifier (+) indicating that at least one element is indicated in the application path. Such an entry defines a policy that Application Protocol 1 is capable of being communicated via any SOCKS protocol as long as the application path identifies an element in a layer above SOCKS.

As another example, the truncated path *.QUIC.*.HTTP may correspond to any network traffic over QUIC and HTTP, with any communication protocol in a layer between the HTTP layer and QUIC. As shown in FIG. 2, the network traffic having such a path is to be denied according to the policy. In some implementations, a particular truncation identifier may indicate that a set of possible matching application names, communication protocols, and/or the like are to be included in the application path to allow or deny network traffic associated with that truncated application path. The set of possible matching elements may be stored and/or located in another security policy database and/or the policy mapping (e.g., in one or more other columns of the mapping).

Accordingly, a single entry may be included in the policy mapping that is representative of a same policy for a plurality of communication protocols that can be used in association with an application protocol.

As indicated above, FIG. 2 is provided merely as one or more examples. Other examples may differ from what is described with regard to FIG. 2.

Accordingly, as described herein, a network device, such as a firewall, may be configured to have an application protocol-based policy (and/or an application-specific policy) that enables communication via a particular communication protocol without requiring corresponding policies to be created for other application protocols to allow and/or prevent network traffic utilizing the communication protocol. In this way, computing resources of the network device can be conserved. For example, computing resources associated with creating, generating, and/or storing policies to deny network traffic associated with a plurality of application protocols and a same communication protocol, when network traffic associated with another application protocol can be used with the communication protocol, can be conserved. Furthermore, the network device, being configured as described herein, can conserve network resources consumed by communications that are dropped using communication protocol-based policies. For example, such communication protocol-based policies may prevent an application protocol from being communicated in association with a preferred communication protocol that is blocked by the communication protocol-based policy. Accordingly, a network device, as described herein, may be configured to operate and/or enforce policies (e.g., policies associated with allowing or denying communication of network traffic) in a more efficient manner and/or more effectively than previous techniques.

Figure 3:
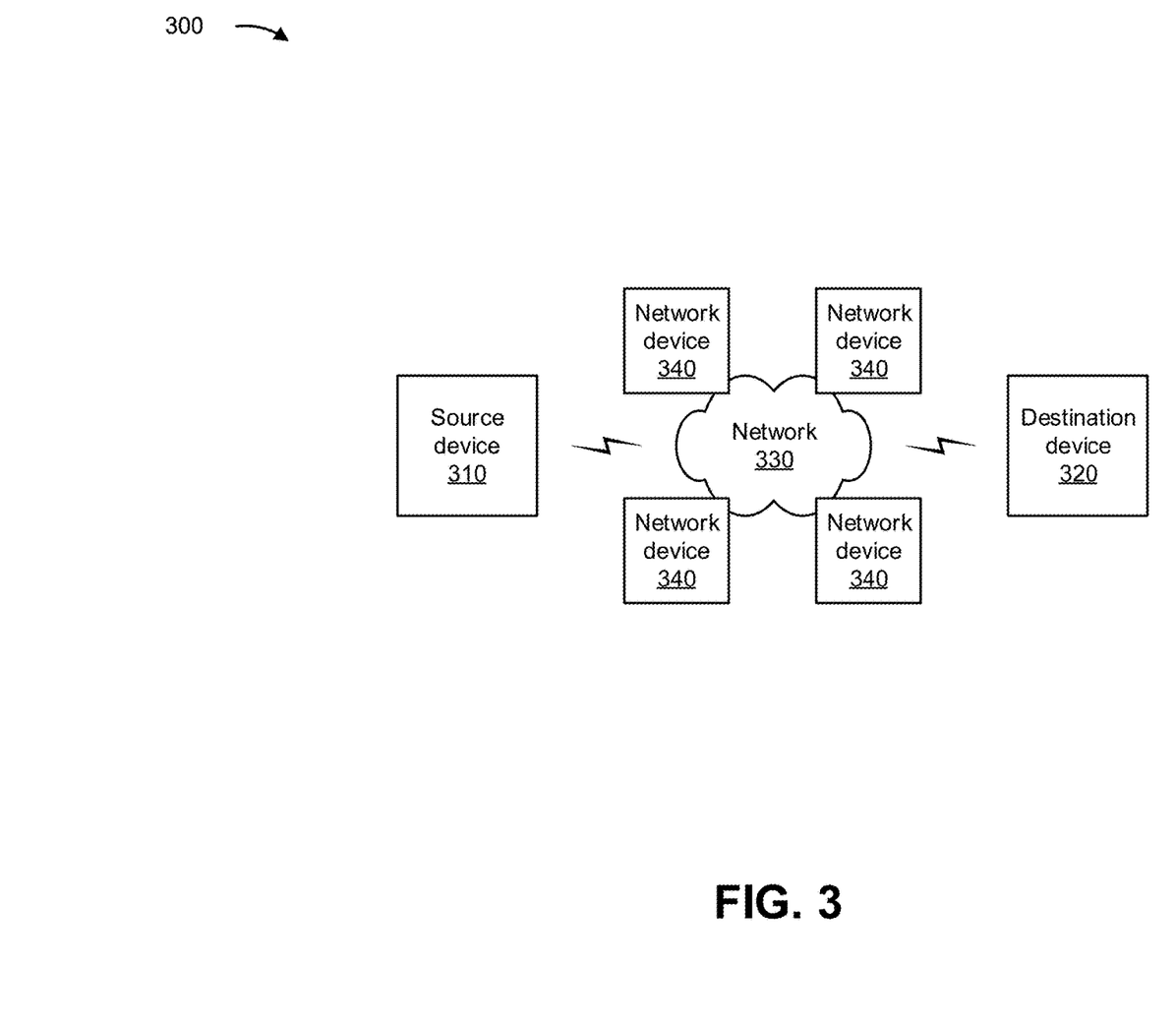
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a source device 310, a destination device 320, a network 330, and one or more network devices 340 (referred to herein individually as network device 340 or collectively as network devices 340). Devices of environment 300 may interconnect via wired connections, wireless connections, or a combination of wired and wireless connections.

Source device 310 and/or destination device 320 may include one or more user devices. For example, source device 310 and/or destination device 320 may include one or more devices capable of receiving, generating, storing, processing, and/or providing network traffic associated with an application and/or a session, as described herein. Source device 310 and/or destination device 320 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. In some implementations, source device and/or destination device may be a cloud-based platform of a cloud computing environment, a web-based platform, an online platform, and/or the like. Source device 310 and destination device 320 may correspond to the first endpoint device and the second endpoint device described in connection with example implementation 100.

Network 330 includes one or more wired and/or wireless networks. For example, network 330 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Network device 340 includes one or more devices (e.g., one or more traffic transfer devices) capable of processing and/or transferring traffic between endpoint devices (e.g., source device 310 and destination device 320). For example, network device 340 may include a firewall, a router, a gateway, a switch, a hub, a bridge, a reverse proxy, a server (e.g., a proxy server), a security device, an intrusion detection device, a load balancer, or a similar device. In some implementations, network device 340 may be a physical device implemented within a housing, such as a chassis. In some implementations, network device 340 may be a virtual device implemented by one or more computer devices of a cloud computing environment or a data center.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
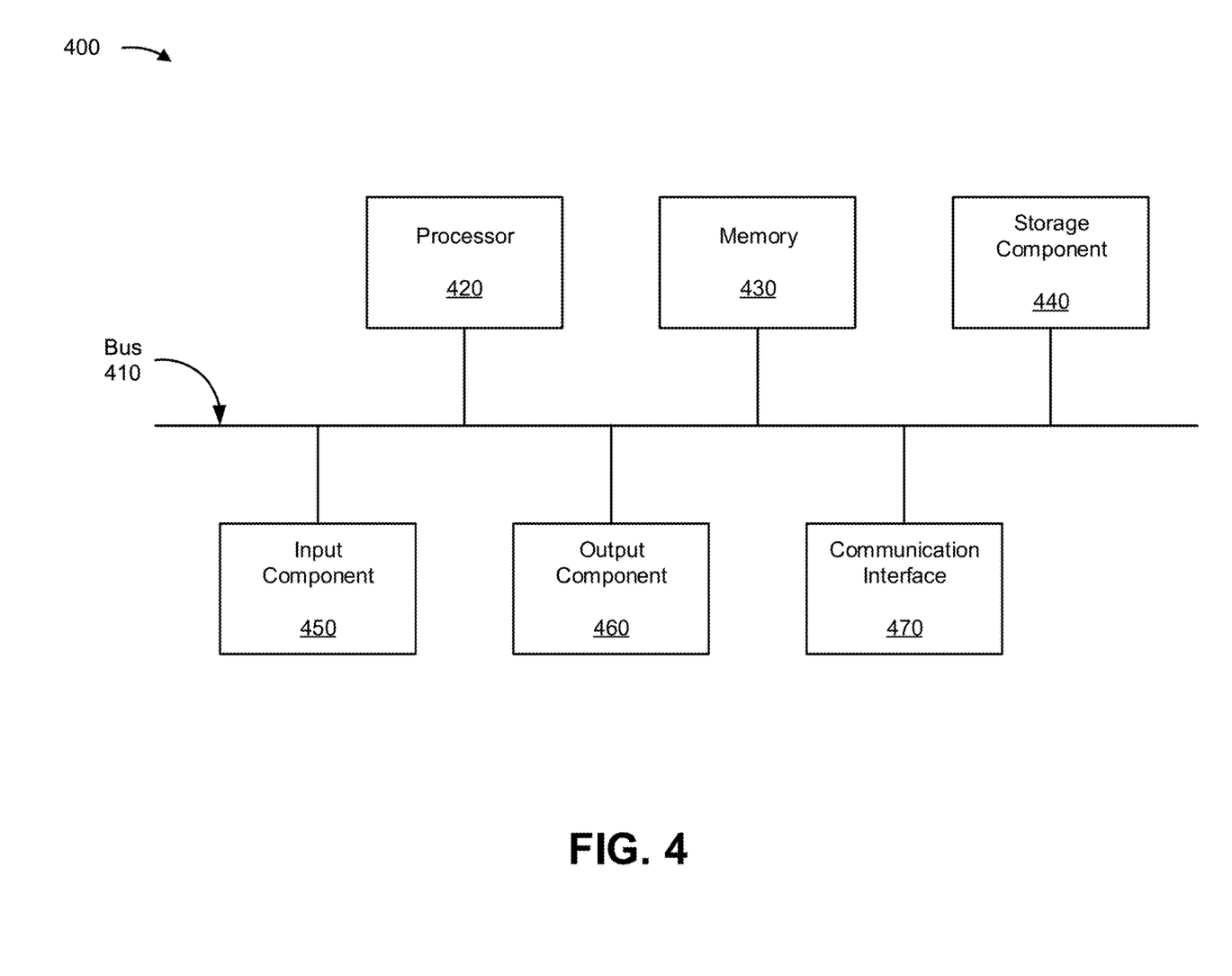
FIG. 4 is a diagram of example components of one or more devices of FIG. 3.

FIG. 4 is a diagram of example components of a device 400. Device 400 may correspond to source device 310, destination device 320 and/or network device 340. In some implementations, source device 310, destination device 320 and/or network device 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive. Storage component 440 may be used to store and/or implement the security policy database of example implementation 100.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
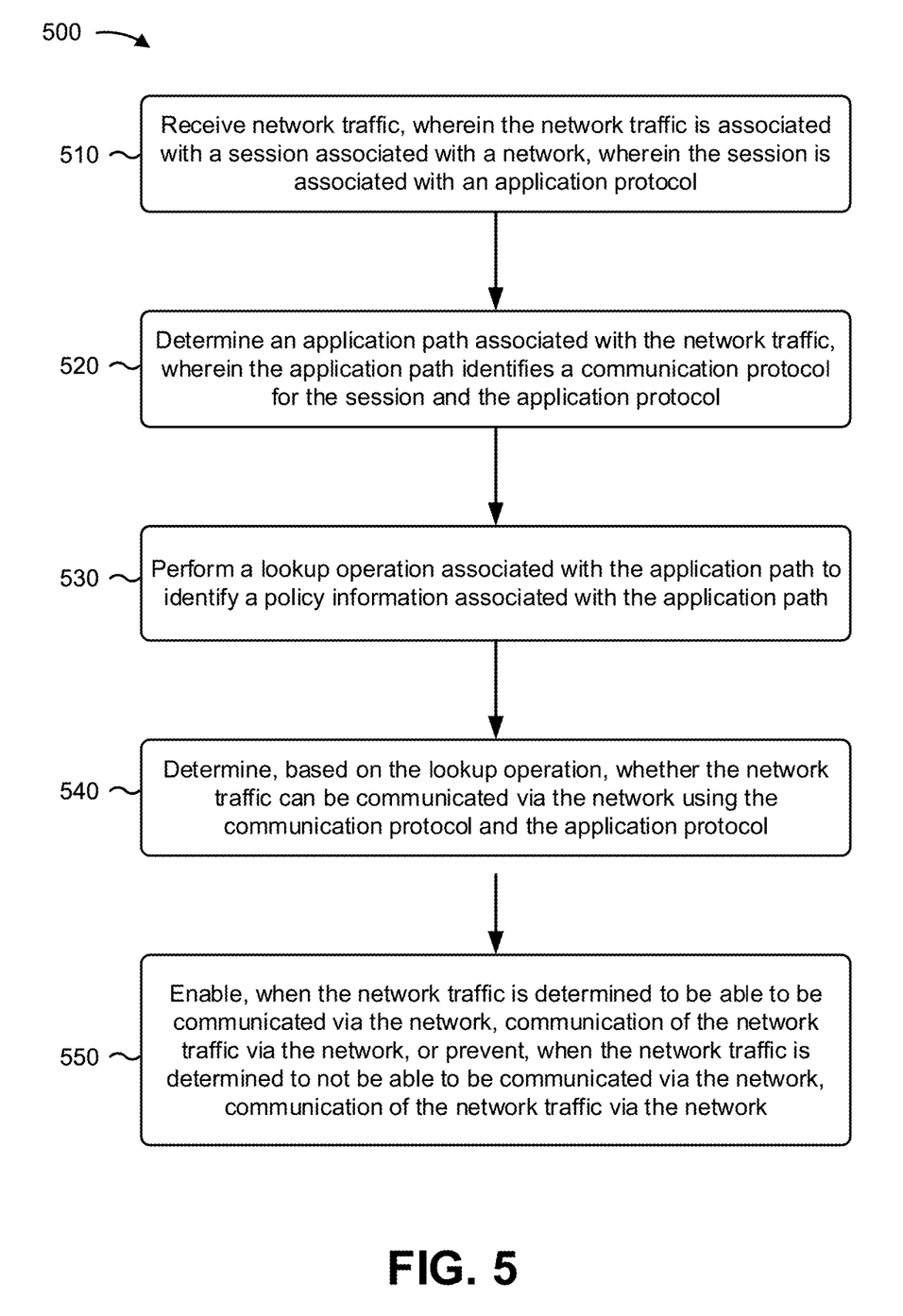
FIGS. 5-7 are flowcharts of one or more example processes associated with network traffic control based on an application path.

FIG. 5 is a flow chart of an example process 500 for network traffic control based on an application path. In some implementations, one or more process blocks of FIG. 5 may be performed by network device (e.g., network device 340). In some implementations, one or more process blocks of FIG. 5 may be performed by another device or a group of devices separate from or including the network device, such as a source device (e.g., source device 310), a destination device (e.g., destination device 320), and/or the like.

As shown in FIG. 5, process 500 may include receiving network traffic, wherein the network traffic is associated with a session associated with a network, wherein the session is associated with an application protocol (block 510). For example, the network device (e.g., using processor 420, memory 430, storage component 440, input component 450, output component 460, communication interface 470 and/or the like) may network traffic, as described above. In some implementations, the network traffic is associated with a session associated with a network. In some implementations, the session is associated with an application protocol.

As further shown in FIG. 5, process 500 may include determining an application path associated with the network traffic, wherein the application path identifies a communication protocol for the session and the application protocol (block 520). For example, the network device (e.g., using processor 420, memory 430, storage component 440, input component 450, output component 460, communication interface 470 and/or the like) may determine an application path associated with the network traffic, as described above. In some implementations, the application path identifies a communication protocol for the session and the application protocol.

As further shown in FIG. 5, process 500 may include performing a lookup operation associated with the application path to identify a policy information associated with the application path (block 530). For example, the network device (e.g., using processor 420, memory 430, storage component 440, input component 450, output component 460, communication interface 470 and/or the like) may perform a lookup operation associated with the application path to identify a policy information associated with the application path, as described above.

As further shown in FIG. 5, process 500 may include determining, based on the lookup operation, whether the network traffic can be communicated via the network using the communication protocol and the application protocol (block 540). For example, the network device (e.g., using processor 420, memory 430, storage component 440, input component 450, output component 460, communication interface 470 and/or the like) may determine, based on the lookup operation, whether the network traffic can be communicated via the network using the communication protocol and the application protocol, as described above.

As further shown in FIG. 5, process 500 may include enabling, when the network traffic is determined to be able to be communicated via the network, communication of the network traffic via the network, or preventing, when the network traffic is determined to not be able to be communicated via the network, communication of the network traffic via the network (block 550). For example, the network device (e.g., using processor 420, memory 430, storage component 440, input component 450, output component 460, communication interface 470 and/or the like) may enable when communication of the network traffic is determined to be allowable, the data communication or the network traffic to be communicated via the network, or the network device (e.g., using processor 420, memory 430, storage component 440, input component 450, output component 460, communication interface 470 and/or the like) may prevent, when communication of the network traffic is determined to not be allowable, the data communication or the network traffic from being communicated via the network, as described above.

Process 500 may include additional implementations, such as any single implementation or any combination of implementations described below and/or in connection with one or more other processes described elsewhere herein.

In a first implementation, the network device may generate the policy information based on a user input associated with a security threshold of the network and at least one of security characteristics of the application protocol, or security characteristics of the communication protocol.

In a second implementation, alone or in combination with the first implementation, the network device, when performing the lookup operation, may identify the application path, locate, in a policy mapping and based on the application protocol, an entry associated with the application path, and obtain policy information from the entry.

In a third implementation, alone or in combination with one or more of the first and second implementations, the entry is associated with the communication protocol based on the entry including the application path, wherein the entry includes a truncation identifier associated with the application path, and wherein the truncation identifier includes at least one of a first identifier that represents any element of the application path of the entry, a second identifier that represents that at least one element is included in the application path of the entry, or a third identifier that represents that at least one of a particular set of elements are included in the application path of the entry.

In a fourth implementation, alone or in combination with one or more of the first through third implementations, the entry is associated with the communication protocol based on the communication protocol being one of a plurality of communication protocols that can be identified by a same portion of the application path, and the entry includes the same portion of the application path.

In a fifth implementation, alone or in combination with one or more of the first through fourth implementations, the network device may log the identified application path in association with whether the communication of the network traffic is enabled or denied, wherein the logged application path is logged in association with an application path identified in the entry.

In a sixth implementation, alone or in combination with one or more of the first through fifth implementations, at least one of: the communication protocol is associated with an intermediate layer of a protocol stack associated with the session, or the application protocol is a top layer of the protocol stack associated with the session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
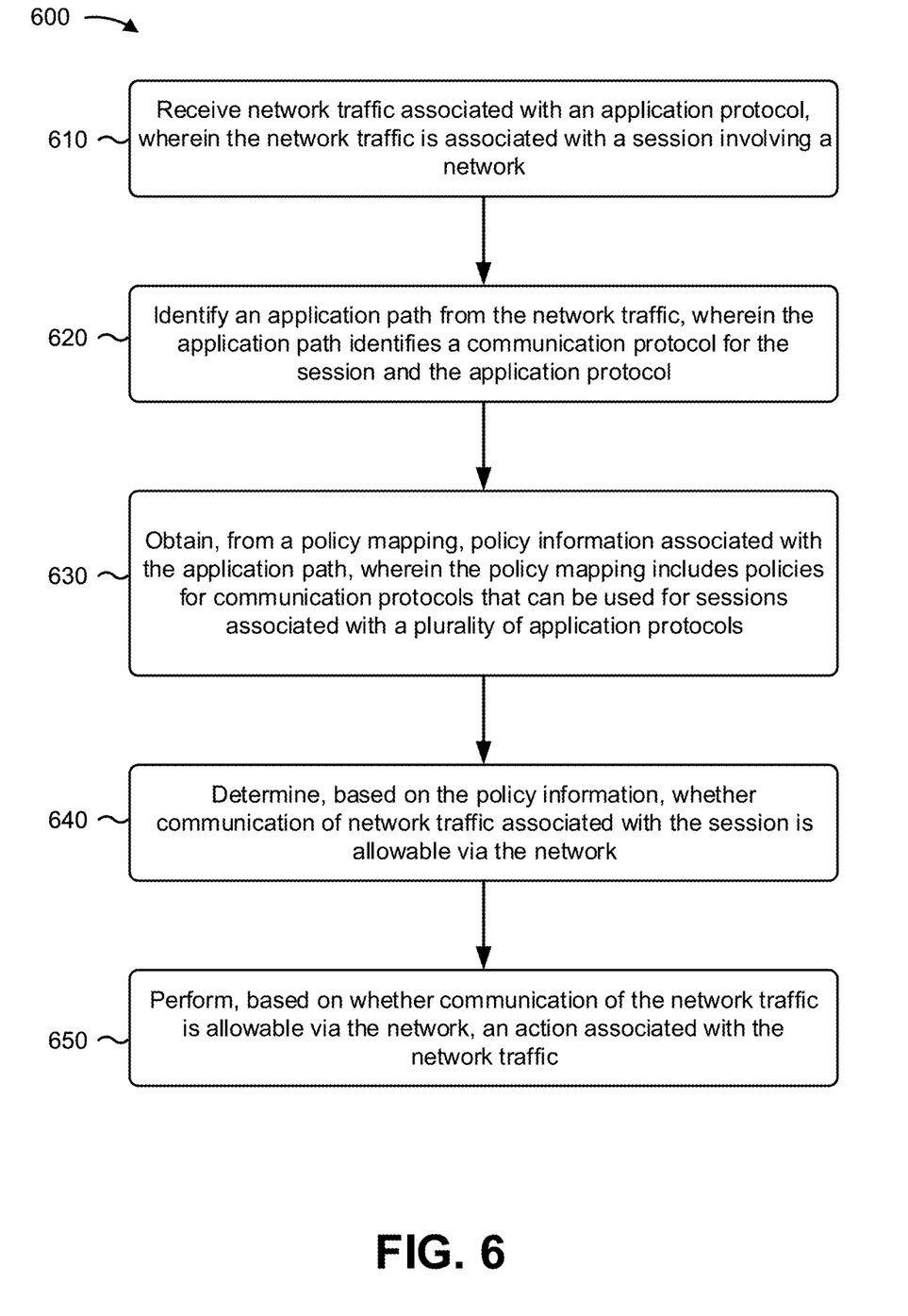

FIG. 6 is a flow chart of an example process 600 for network traffic control based on an application path. In some implementations, one or more process blocks of FIG. 6 may be performed by network device (e.g., network device 340). In some implementations, one or more process blocks of FIG. 6 may be performed by another device or a group of devices separate from or including the network device, such as a source device (e.g., source device 310), a destination device (e.g., destination device 320), and/or the like.

As shown in FIG. 6, process 600 may include receiving network traffic associated with an application protocol, wherein the network traffic is associated with a session involving a network (block 610). For example, the network device (e.g., using processor 420, memory 430, storage component 440, input component 450, output component 460, communication interface 470 and/or the like) may receive network traffic associated with an application protocol, as described above. In some implementations, the network traffic is associated with a session involving a network.

As further shown in FIG. 6, process 600 may include identifying an application path from the network traffic, wherein the application path identifies a communication protocol for the session and the application protocol (block 620). For example, the network device (e.g., using processor 420, memory 430, storage component 440, input component 450, output component 460, communication interface 470 and/or the like) may identify an application path from the network traffic, as described above. In some implementations, the application path identifies a communication protocol for the session and the application protocol.

As further shown in FIG. 6, process 600 may include obtaining, from a policy mapping, policy information associated with the application path, wherein the policy mapping includes policies for communication protocols that can be used for sessions associated with a plurality of application protocols (block 630). For example, the network device (e.g., using processor 420, memory 430, storage component 440, input component 450, output component 460, communication interface 470 and/or the like) may obtain, from a policy mapping, policy information associated with the application path, as described above. In some implementations, the policy mapping includes policies for communication protocols that can be used for sessions associated with a plurality of application protocols.

As further shown in FIG. 6, process 600 may include determining, based on the policy information, whether communication of network traffic associated with the session is allowable via the network (block 640). For example, the network device (e.g., using processor 420, memory 430, storage component 440, input component 450, output component 460, communication interface 470 and/or the like) may determine, based on the policy information, whether communication of network traffic associated with the session is allowable via the network, as described above.

As further shown in FIG. 6, process 600 may include performing, based on whether communication of the network traffic is allowable via the network, an action associated with the network traffic (block 650). For example, the network device (e.g., using processor 420, memory 430, storage component 440, input component 450, output component 460, communication interface 470 and/or the like) may perform, based on whether communication of the network traffic is allowable via the network, an action associated with the network traffic, as described above.

Process 600 may include additional implementations, such as any single implementation or any combination of implementations described below and/or in connection with one or more other processes described elsewhere herein.

In a first implementation, the network device may generate, in the policy mapping and based on the communication protocol satisfying a security threshold of the network, the policy information to indicate that the communication protocol can be used in association with the application protocol, or generate, in the policy mapping and based on the communication protocol not satisfying the security threshold of the network, the policy to indicate that the communication protocol cannot be used in association with the application protocol.

In a second implementation, alone or in combination with the first implementation, the policy information is obtained from an entry, in the policy mapping, that identifies the application path. In a third implementation, alone or in combination with one or more of the first and second implementations, the policy information is obtained from an entry, in the policy mapping, that identifies a portion of the application path.

In a fourth implementation, alone or in combination with one or more of the first through third implementations, the network device, when performing the action, may at least one of: forward, when communication of the network traffic is determined to be allowable, the network traffic via the network, or prevent, when communication of the network traffic is determined to not be allowable, the network traffic from being communicated via the network.

In a fifth implementation, alone or in combination with one or more of the first through fourth implementations, the network device is a firewall of the network. In a sixth implementation, alone or in combination with one or more of the first through fifth implementations, at least one of: the communication protocol is associated with an intermediate layer of a protocol stack associated with the session, or the application protocol is a top layer of the protocol stack associated with the session.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
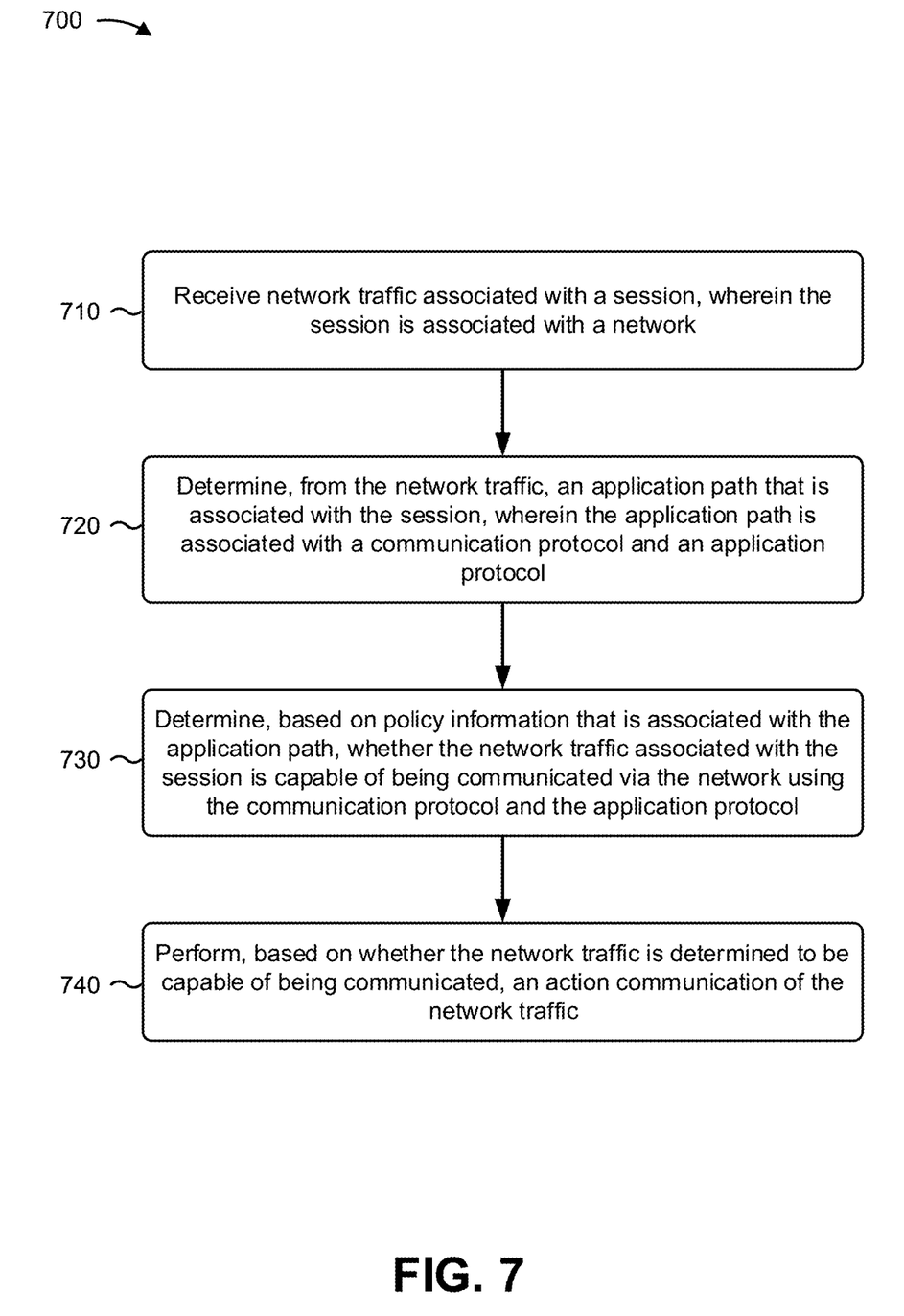

FIG. 7 is a flow chart of an example process 700 for network traffic control based on an application path. In some implementations, one or more process blocks of FIG. 7 may be performed by network device (e.g., network device 340). In some implementations, one or more process blocks of FIG. 7 may be performed by another device or a group of devices separate from or including the network device, such as a source device (e.g., source device 310), a destination device (e.g., destination device 320), and/or the like.

As shown in FIG. 7, process 700 may include receiving network traffic associated with a session, wherein the session is associated with a network (block 710). For example, the network device (e.g., using processor 420, memory 430, storage component 440, input component 450, output component 460, communication interface 470 and/or the like) may network traffic associated with a session, as described above. In some implementations, the session is associated with a network.

As further shown in FIG. 7, process 700 may include determining, from the network traffic, an application path that is associated with the session, wherein the application path is associated with a communication protocol and an application protocol (block 720). For example, the network device (e.g., using processor 420, memory 430, storage component 440, input component 450, output component 460, communication interface 470 and/or the like) may determine, from the network traffic, an application path that is associated with the session, as described above. In some implementations, the application path is associated with a communication protocol and an application protocol.

As further shown in FIG. 7, process 700 may include determining, based on policy information that is associated with the application path, whether the network traffic associated with the session is capable of being communicated via the network using the communication protocol and the application protocol (block 730). For example, the network device (e.g., using processor 420, memory 430, storage component 440, input component 450, output component 460, communication interface 470 and/or the like) may determine, based on policy information that is associated with the application path, whether the network traffic associated with the session is capable of being communicated via the network using the communication protocol and the application protocol, as described above.

As further shown in FIG. 7, process 700 may include performing, based on whether the network traffic is determined to be capable of being communicated, an action associated with enabling or preventing communication of the network traffic (block 740). For example, the network device (e.g., using processor 420, memory 430, storage component 440, input component 450, output component 460, communication interface 470 and/or the like) may perform, based on whether the network traffic is determined to be capable of being communicated, an action associated with enabling or preventing communication of the network traffic, as described above.

Process 700 may include additional implementations, such as any single implementation or any combination of implementations described below and/or in connection with one or more other processes described elsewhere herein.

In a first implementation, the network device may generate the policy mapping based on a security threshold associated with the network and a security characteristic of the application protocol. In a second implementation, alone or in combination with the first implementation, the application path is determined from the network traffic using a deep packet inspection.

In a third implementation, alone or in combination with one or more of the first and second implementations, the application protocol comprises a hypertext transfer protocol, and, the communication protocol comprises at least one of: a transmission control protocol, a transport layer security protocol, a secure socket layer protocol, a quick user datagram protocol Internet connection protocol, or a SOCKS protocol.

In a fourth implementation, alone or in combination with one or more of the first through third implementations, the application path is determined from a plurality of PDUs of the network traffic. In a fifth implementation, alone or in combination with one or more of the first through fourth implementations, at least one of: the communication protocol is associated with an intermediate layer of a protocol stack associated with the session, or the application protocol is a top layer of the protocol stack associated with the session.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, network traffic,
      wherein the network traffic is associated with a session associated with a network,
         wherein the session is associated with an application protocol;
   determining, by the network device, an application path associated with the network traffic;
   determining, by the network device and based on parsing one or more communication protocol elements and one or more application protocol elements from the application path, a communication protocol associated with the session and the application protocol;
   performing, by the network device, a lookup operation associated with the application path to identify a policy information associated with the application path;
   determining, by the network device and based on the lookup operation, whether the network traffic can be communicated via the network using the communication protocol and the application protocol; and
   enabling, by the network device, when the network traffic is determined to be able to be communicated via the network, communication of the network traffic via the network, or
   preventing, by the network device, when the network traffic is determined to not be able to be communicated via the network, communication of the network traffic via the network.

2. The method of claim 1, further comprising:
   generating the policy information based on a user input associated with a security threshold of the network and at least one of:
      security characteristics of the application protocol, or
      security characteristics of the communication protocol.

3. The method of claim 1, wherein performing the lookup operation comprises:
   identifying the application path;
   locating, in a policy mapping and based on the application path, an entry associated with the application path; and
   obtaining the policy information from the entry,
      wherein the policy information indicates whether the network traffic can be communicated via the network.

4. The method of claim 3, wherein the entry is associated with the communication protocol based on the entry including the application path,
   wherein the entry includes a truncation identifier associated with the application path,
      wherein the truncation identifier includes at least one of:
         a first identifier that represents any element of the application path of the entry,
         a second identifier that represents that at least one element is included in the application path of the entry, or
         a third identifier that represents that at least one of a particular set of elements are included in the application path of the entry.

5. The method of claim 3, wherein the entry is associated with the communication protocol based on the communication protocol being one of a plurality of communication protocols that can be identified by a same portion of the application path,
   wherein the entry includes the same portion of the application path.

6. The method of claim 3, further comprising:
   logging information associated with the application path in association with whether the communication of the network traffic is enabled or denied,
      wherein the logged information associated with the application path is logged in association with the entry.

7. The method of claim 1, wherein at least one of:
   the communication protocol is associated with an intermediate layer of a protocol stack associated with the session, or
   the application protocol is a top layer of the protocol stack associated with the session.

8. A network device, comprising:
   one or more memories; and
   one or more processors communicatively coupled to the one or more memories, configured to:
      receive network traffic associated with an application protocol,
         wherein the network traffic is associated with a session involving a network;
      identify an application path from the network traffic;
      determine, based on parsing one or more communication protocol elements and one or more application protocol elements from the application path, a communication protocol associated with the session and the application protocol;
      obtain, from a policy mapping, policy information associated with the application path,
         wherein the policy mapping includes policies for communication protocols that can be used for sessions associated with a plurality of application protocols;
      determine, based on the policy information, whether communication of network traffic associated with the session is allowable via the network using the communication protocol and the application protocol; and
      perform, based on whether communication of the network traffic is allowable via the network, an action associated with the network traffic.

9. The network device of claim 8, wherein the one or more processors are further configured to:
   generate, in the policy mapping and based on the communication protocol satisfying a security threshold of the network, the policy information to indicate that the communication protocol can be used in association with the application protocol, or
   generate, in the policy mapping and based on the communication protocol not satisfying the security threshold of the network, the policy to indicate that the communication protocol cannot be used in association with the application protocol.

10. The network device of claim 8, wherein the policy information is obtained from an entry, in the policy mapping, that identifies the application path.

11. The network device of claim 8, wherein the policy information is obtained from an entry, in the policy mapping, that identifies a portion of the application path.

12. The network device of claim 8, wherein the one or more processors, when performing the action, are to at least one of:
forward, when communication of the network traffic is determined to be allowable, the network traffic via the network, or
prevent, when communication of the network traffic is determined to not be allowable, the network traffic from being communicated via the network.

13. The network device of claim 8, wherein the network device is a firewall of the network.

14. The network device of claim 8, wherein at least one of:
the communication-protocol is associated with an intermediate layer of a protocol stack associated with the session, or
the application protocol is a top layer of the protocol stack associated with the session.

15. A non-transitory computer-readable medium storing instructions, the instructions comprising:
one or more instructions that, when executed by one or more processors, cause the one or more processors to:
receive network traffic associated with a session, wherein the session is associated with a network;
determine, from the network traffic, an application path that is associated with the session;
determine, based on parsing one or more communication protocol elements and one or more application protocol elements from the application path, a communication protocol associated with the session and the application protocol;
determine, based on policy information that is associated with the application path, whether the network traffic associated with the session is capable of being communicated via the network using the communication protocol and the application protocol; and
perform, based on whether the network traffic is determined to be capable of being communicated, an action associated with communication of the network traffic.

16. The non-transitory computer-readable medium of claim 15, wherein the one or more instructions, when executed by the one or more processors, further cause the one or more processors to:
generate the policy mapping based on a security threshold associated with the network and a security characteristic of the application protocol.

17. The non-transitory computer-readable medium of claim 15, wherein the application path is parsed from the network traffic using a deep packet inspection.

18. The non-transitory computer-readable medium of claim 15, wherein the application protocol comprises a hypertext transfer protocol, and
wherein the communication protocol comprises at least one of:
a transmission control protocol,
a transport layer security protocol,
a secure socket layer protocol,
a quick user datagram protocol Internet connection protocol, or
a SOCKS protocol.

19. The non-transitory computer-readable medium of claim 15, wherein the application path is determined from a plurality of protocol data units of the network traffic.

20. The non-transitory computer-readable medium of claim 15, wherein at least one of:
the communication protocol is associated with an intermediate layer of a protocol stack associated with the session, or
the application protocol is a top layer of the protocol stack associated with the session.

* * * * *